(12) United States Patent
Shindo

(10) Patent No.: US 10,968,979 B2
(45) Date of Patent: Apr. 6, 2021

(54) TRANSMISSION BELT

(71) Applicant: BANDO CHEMICAL INDUSTRIES, LTD., Kobe (JP)

(72) Inventor: Yuya Shindo, Kobe (JP)

(73) Assignee: BANDO CHEMICAL INDUSTRIES, LTD., Kobe (JP)

(*) Notice: Subject to any disclaimer, the term of this patent is extended or adjusted under 35 U.S.C. 154(b) by 0 days.

(21) Appl. No.: 16/838,003

(22) Filed: Apr. 1, 2020

(65) Prior Publication Data
US 2020/0232539 A1    Jul. 23, 2020

Related U.S. Application Data

(63) Continuation of application No. PCT/JP2018/036649, filed on Oct. 1, 2018.

(30) Foreign Application Priority Data

Oct. 2, 2017 (JP) .............................. JP2017-192829

(51) Int. Cl.
*F16G 1/22* (2006.01)
*F16G 1/10* (2006.01)
(Continued)

(52) U.S. Cl.
CPC .................. *F16G 1/22* (2013.01); *F16G 1/10* (2013.01); *F16G 1/28* (2013.01); *F16G 5/08* (2013.01); *F16G 5/20* (2013.01)

(58) Field of Classification Search
CPC ..... F16G 1/10; F16G 1/22; F16G 1/28; F16G 5/06; F16G 5/108; F16G 5/20
See application file for complete search history.

(56) References Cited

U.S. PATENT DOCUMENTS 3,981,206 A * 9/1976 Miranti, Jr. .......... B29D 29/103
474/238
6,491,598 B1   12/2002 Rosenboom
(Continued)

FOREIGN PATENT DOCUMENTS

DE   102008033267 A1   1/2010
EP   3 045 771 A1    8/2014
(Continued)

OTHER PUBLICATIONS

JP Notification of Reason for Refusal dated Dec. 14, 2018 as received in Application No. 2018-552086.
(Continued)

*Primary Examiner* — Michael R Mansen
*Assistant Examiner* — Robert T Reese
(74) *Attorney, Agent, or Firm* — Maschoff Brennan

(57) ABSTRACT

A power transmission belt includes: a belt body and a cover fabric made of a fabric containing synthetic fibers as a main component and covering a surface of the belt body toward a pulley contact surface. The cover fabric has a surface toward the belt body, and the surface is in contact with a rubber composition containing cellulose-based short fibers. The rubber composition includes a rubber component in which the cellulose-based short fibers are dispersed. The cover fabric and the rubber composition containing the cellulose-based short fibers are exposed on a pulley contact surface.

12 Claims, 11 Drawing Sheets

(51) Int. Cl.
*F16G 1/28* (2006.01)
*F16G 5/20* (2006.01)
*F16G 5/08* (2006.01)

(56) References Cited

U.S. PATENT DOCUMENTS

| | | | |
|---|---|---|---|
| 8,632,650 B2* | 1/2014 | Mori | D03D 3/02 156/141 |
| 2003/0073533 A1* | 4/2003 | Knutson | F16G 5/08 474/263 |
| 2007/0082777 A1* | 4/2007 | Nishida | F16G 5/20 474/237 |
| 2011/0111902 A1 | 5/2011 | Well et al. | |
| 2012/0097352 A1* | 4/2012 | Rasanen | D21H 21/14 162/157.6 |
| 2013/0217528 A1* | 8/2013 | Matsumoto | D02G 3/44 474/263 |
| 2015/0369335 A1 | 12/2015 | Ishiguro et al. | |
| 2016/0010722 A1 | 1/2016 | Kim et al. | |
| 2016/0351874 A1* | 12/2016 | Kang | H01M 10/0525 |
| 2017/0009847 A1* | 1/2017 | Mitsutomi | F16G 5/20 |
| 2019/0346014 A1* | 11/2019 | Virtue | B29D 29/08 |
| 2020/0172684 A1* | 6/2020 | Hiroishi | B29B 17/02 |

FOREIGN PATENT DOCUMENTS

| | | |
|---|---|---|
| JP | 2010-242825 A1 | 10/2010 |
| JP | 2014-126132 A | 7/2014 |
| JP | 2014-167347 A | 9/2014 |
| JP | 2015-127590 A | 7/2015 |
| WO | 2014/147948 A1 | 9/2014 |

OTHER PUBLICATIONS

JP Notification of Reason for Refusal dated Jan. 22, 2019 as received in Application No. 2018-552086.
JP Decision to Grant dated Mar. 19, 2019 as received in Application No. 2018-552086.
Written Opinion dated Nov. 12, 2018 as received in application No. PCT/JP2018/036649.
International Search Report dated Nov. 12, 2018 as received in application No. PCT/JP2018/036649.

* cited by examiner

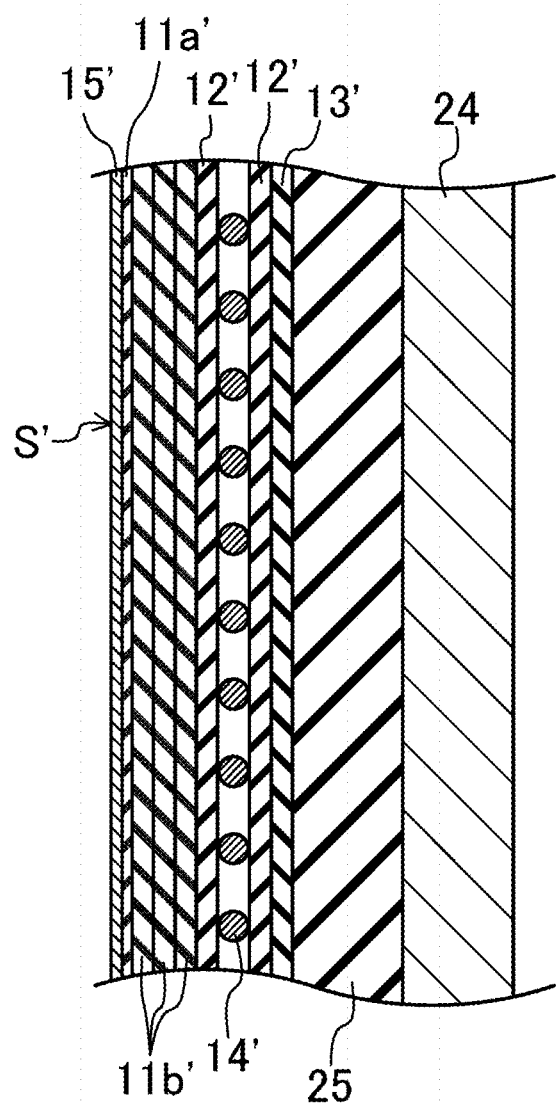

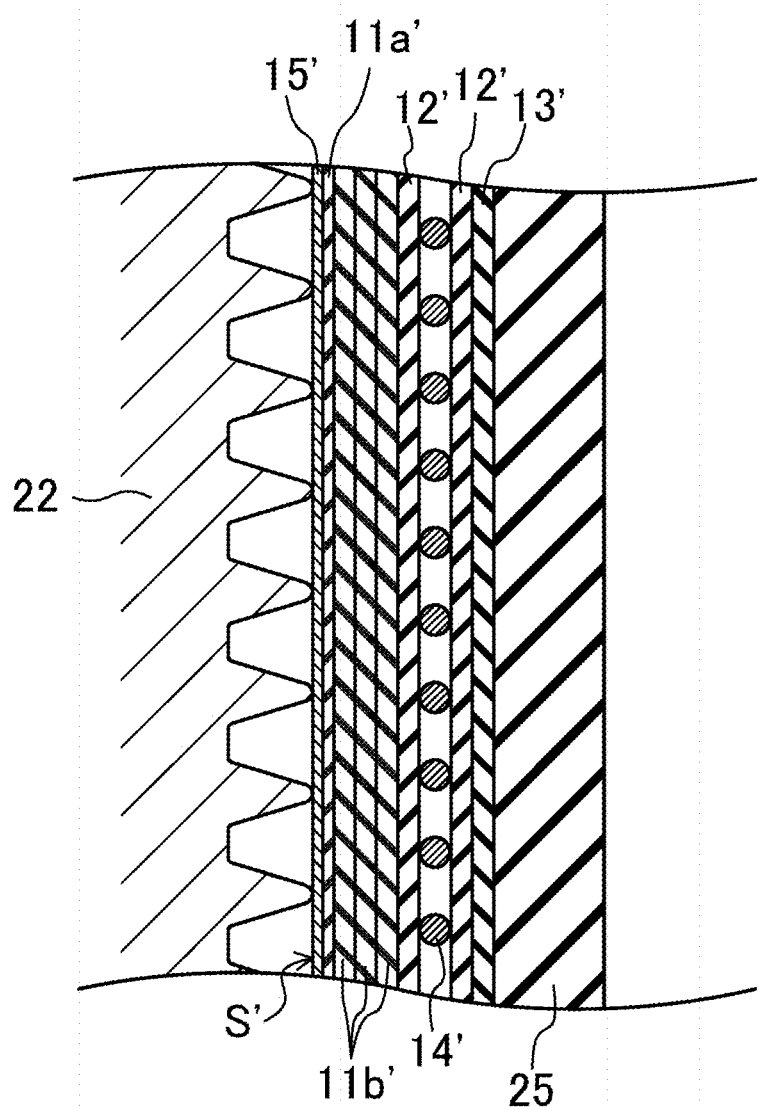

COVER FABRIC

TRANSMISSION BELT

CROSS-REFERENCE TO RELATED APPLICATION

This is a continuation of International Application No. PCT/JP2018/036649 filed on Oct. 1, 2018, which claims priority to Japanese Patent Application No. 2017-192829 filed on Oct. 2, 2017. The entire disclosures of these applications are incorporated by reference herein.

BACKGROUND

The present invention relates to a power transmission belt.

A power transmission belt is known whose pulley contact surface is covered with a woven fabric, for example. For example, Japanese Unexamined Patent Publication No. 2014-126132 discloses a V-ribbed belt having V-shaped ribs whose surfaces are covered with a reinforcing fabric with openings. The surface of the reinforcing fabric at the belt body is in contact with a base layer of a thermoplastic resin. The base layer is exposed through the openings of the reinforcing fabric. Japanese Unexamined Patent Publication No. 2015-127590 discloses a V-ribbed belt having V-shaped ribs whose surfaces are covered with a warp knitted fabric made of cellulose-based fibers and polyester fibers.

SUMMARY

The present invention provides a power transmission belt including: a belt body; and a cover fabric made of a fabric containing synthetic fibers as a main component and covering a surface of the belt body toward a pulley contact surface. The cover fabric has a surface toward the belt body, and the surface is in contact with a rubber composition containing cellulose-based short fibers. The rubber composition includes a rubber component in which the cellulose-based short fibers are dispersed. The cover fabric and the rubber composition containing the cellulose-based short fibers are exposed on the pulley contact surface.

BRIEF DESCRIPTION OF THE DRAWINGS

FIG. 3A is a first view illustrating a first method of producing the V-ribbed belt according to the embodiment.

FIG. 3B is a second view illustrating the first method of producing the V-ribbed belt according to the embodiment.

DETAILED DESCRIPTION

An Embodiment will be described in detail below.

Figure 1A:
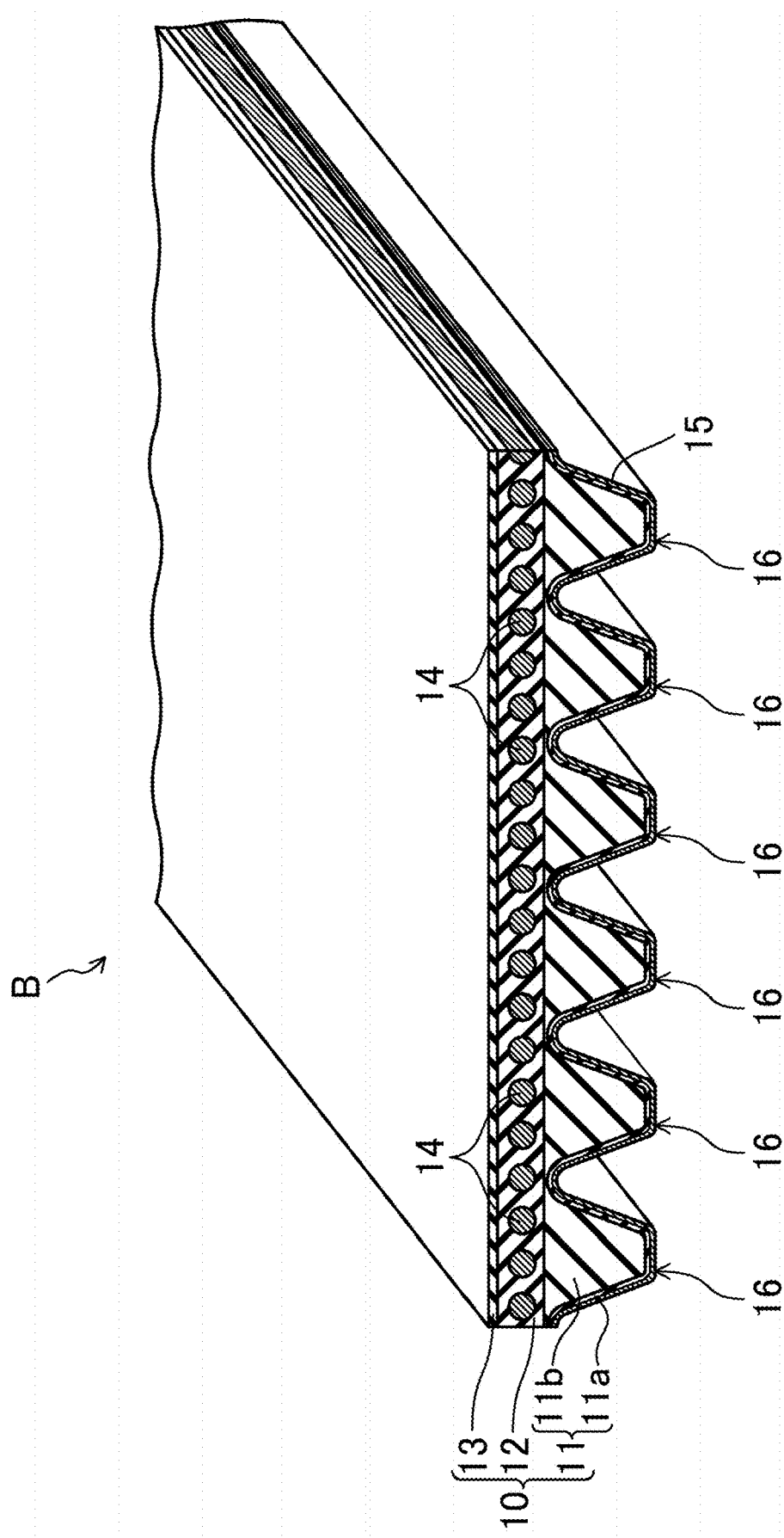
FIG. 1A is a perspective view of a piece of a V-ribbed belt according to an embodiment.
Figure 1B:
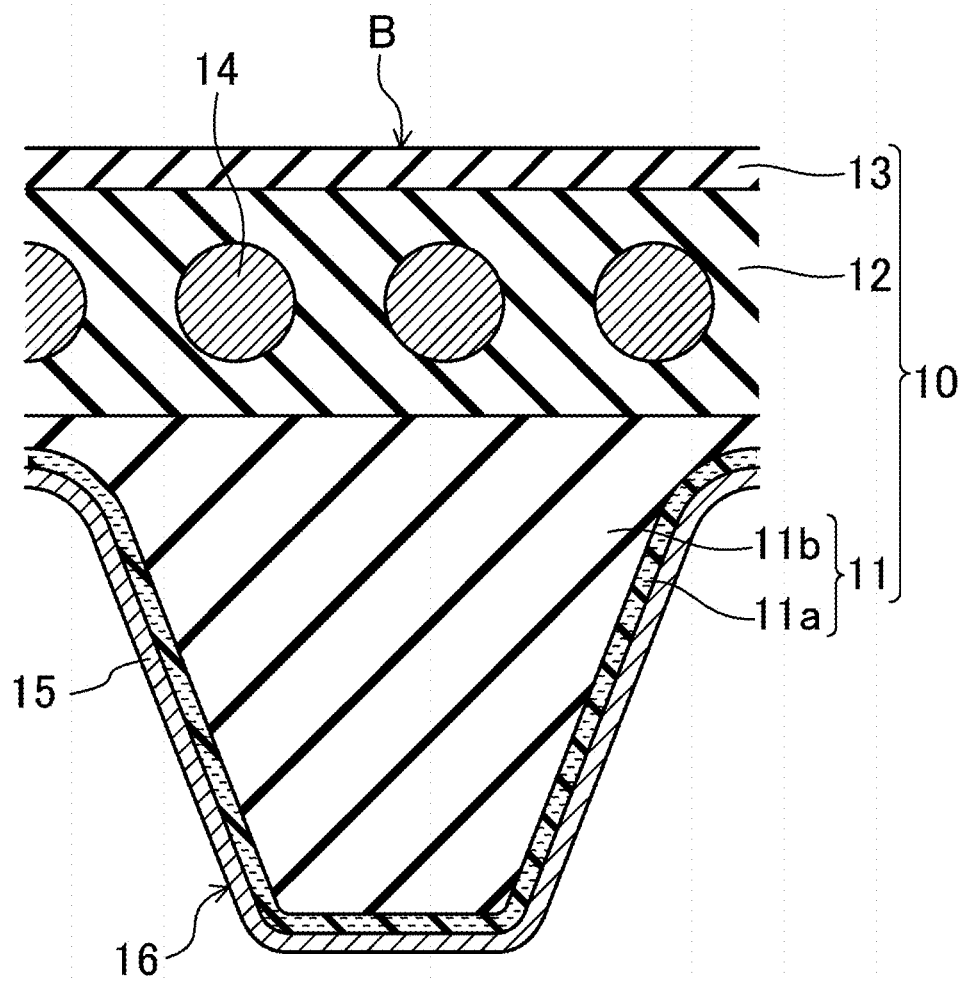
FIG. 1B is a cross-sectional view of a part of the V-ribbed belt according to the embodiment.

FIGS. 1A and 1B illustrate a V-ribbed belt B (transmission belt) according to the embodiment. The V-ribbed belt B of the embodiment is, for example, an endless power transmission member used in an accessory drive belt transmission system in an engine compartment of a motor vehicle. The V-ribbed belt B of the embodiment has a length ranging from 700 mm to 3000 mm, a width ranging from 10 mm to 36 mm, and a thickness ranging from 4.0 mm to 5.0 mm, for example.

The V-ribbed belt B according to the embodiment includes a rubber belt body 10 including a compressed rubber layer 11 on the inner periphery, an adhesive rubber layer 12 in the middle, and a stretch rubber layer 13 on the outer periphery. A cord 14 is embedded in a middle portion in the thickness direction of the adhesive rubber layer 12 of the belt body 10 such that the cord 14 forms a helical pattern having a pitch in the belt width direction. The inner peripheral surface (i.e., a surface toward the pulley contact surface) of the compressed rubber layer 11 of the belt body 10 is covered with a cover fabric 15. Alternatively, the stretch rubber layer 13 may be replaced with a backface reinforcing fabric, and the belt body 10 may be composed of the compressed rubber layer 11 and the adhesive rubber layer 12.

On the inner periphery of the compressed rubber layer 11, a plurality of ribs with a substantially inverted triangular cross section extend in the longitudinal direction of the belt to be parallel to each other in the belt width direction. The surfaces of the ribs are covered with the cover fabric 15 to form V-shaped ribs 16. The V-shaped ribs 16 have, for example, a height ranging from 2.0 mm to 3.0 mm, and a width ranging from 1.0 mm to 3.6 mm at a proximal end. The number of the V-shaped ribs 16 is three or more and six or less (six ribs in FIG. 1), for example.

The compressed rubber layer 11 includes a surface rubber layer 11a and an inner rubber layer 11b. The surface rubber layer 11a is in the shape of a layer along the inner peripheral surface (i.e., the surface toward the pulley contact surface) of the compressed rubber layer 11. The inner rubber layer 11b is provided inside the surface rubber layer 11a. The surface rubber layer 11a has a thickness suitably ranging from 0.5 mm to 1.5 mm, and more suitably ranging from 0.7 mm to 1.0 mm.

The surface rubber layer 11a is made of a rubber composition containing cellulose-based short fibers. The rubber composition includes a rubber component in which the cellulose-based short fibers are dispersed. This rubber composition is obtained by heating and pressing, and thereby crosslinking, an uncrosslinked rubber composition prepared by kneading the rubber component and cellulose-based short fibers and various compound ingredients added to the rubber component. Accordingly, the rubber composition containing cellulose-based short fibers serves as a part of the surface rubber layer 11a of the compressed rubber layer 11 covered with the cover fabric 15 in the belt body 10.

Examples of the rubber component of the rubber composition containing cellulose-based short fibers which forms the surface rubber layer 11a include: an ethylene-α-olefin elastomer such as an ethylene propylene copolymer (EPR), an ethylene-propylene-diene terpolymer (hereinafter referred to as "EPDM"), an ethylene-octene copolymer, and an ethylene-butene copolymer; chloroprene rubber (CR); chlorosulfonated polyethylene rubber (CSM); and hydrogenated acrylonitrile rubber (H-NBR); natural rubber (NR); styrene-butadiene rubber (SBR); butadiene rubber (BR); nitrile rubber (NBR); silicone rubber (Q); and fluorine rubber (FKM). The rubber component of the rubber composition containing cellulose-based short fibers which forms the surface rubber layer 11a suitably includes one kind or two or more kinds of these substances, more suitably includes an ethylene-α-olefin elastomer, and still more suitably includes EPDM.

Examples of the cellulose-based short fibers include short fibers of natural cellulose fibers such as cotton and hemp, regenerated cellulose fibers such as rayon, and acetate fibers. The cellulose-based short fibers suitably includes one kind or two or more kinds of these substances, and more suitably includes cotton. The cellulose-based short fibers have a length suitably ranging from 0.1 mm to 1 mm, and more suitably ranging from 0.3 mm to 0.7 mm. The cellulose-based short fibers has a diameter suitably ranging from 10 μm to 50 μm, and more suitably ranging from 20 μm to 40 μm. The rubber composition containing cellulose-based short fibers suitably contains 5 to 60 parts by mass, more suitably 10 to 50 parts by mass of the cellulose-based short fibers, with respect to 100 parts by mass of the rubber component.

Examples of the compound ingredients include reinforcing materials such as carbon black and silica, oil, processing aids, vulcanization accelerator aids, crosslinking agents such as sulfur and organic oxides, co-crosslinking agents, and vulcanization accelerators. The rubber composition containing cellulose-based short fibers which forms the surface rubber layer 11a may contain short fibers such as nylon fibers, aramid fibers, and polyester fibers other than the short cellulose-based fibers.

The inner rubber layer 11b is made of a rubber composition containing a rubber component crosslinked through heating and pressing of an uncrosslinked rubber composition prepared by kneading the rubber component and various compound ingredients added to the rubber component. The rubber component of the inner rubber layer 11b may be similar to that of the surface rubber layer 11a. The rubber component of the inner rubber layer 11b is the same as that of the surface rubber layer 11a in one suitable embodiment. Like the surface rubber layer 11a, examples of the compound ingredients include reinforcing materials, oil, processing aids, vulcanization accelerator aids, crosslinking agents, co-crosslinking agents, and vulcanization accelerators.

The adhesive rubber layer 12 is in the shape of a strip having a horizontally elongated rectangular cross section, and has a thickness ranging from 1.0 mm to 2.5 mm, for example. The stretch rubber layer 13 is also in the shape of a strip having a horizontally elongated rectangular cross section, and has a thickness ranging from 0.4 mm to 0.8 mm, for example. The stretch rubber layer 13 has a surface having a woven fabric pattern in one suitable embodiment in view of reducing the sound generated at the time of driving on the backface. Each of the adhesive rubber layer 12 and the stretch rubber layer 13 is made of a rubber composition containing a rubber component crosslinked through heating and pressing of an uncrosslinked rubber composition prepared by kneading the rubber component and various compound ingredients added to the rubber component.

The rubber components of the adhesive rubber layer 12 and the stretch rubber layer 13 may be similar to that of the surface rubber layer 11a. The rubber components of the adhesive rubber layer 12 and the stretch rubber layer 13 may be the same as that of the surface rubber layer 11a or the inner rubber layer 11b. Like the surface rubber layer 11a and the inner rubber layer 11b, examples of the compound ingredients include reinforcing materials, oil, processing aids, vulcanization accelerator aids, crosslinking agents, co-crosslinking agents, and vulcanization accelerators.

The cord 14 is made of twisted yarn of polyamide fibers, polyester fibers, aramid fibers, and polyamide fibers, for example. The cord 14 has a diameter ranging from 0.5 mm to 2.5 mm, for example. The distance between the centers of the cord 14 which are adjacent to each other in a cross section ranges from 0.05 mm to 0.20 mm, for example. The cord 14 is subjected to an adhesive treatment using a resorcinol/formalin/latex aqueous solution (hereinafter referred to as "RFL aqueous solution"), rubber cement, or other substances to be adhesive to the belt body 10.

The cover fabric 15 is made of a fabric containing synthetic fibers as a main component. The cover fabric 15 covers the inner peripheral surface (i.e., the surface toward the pulley contact surface) of the surface rubber layer 11a of the compressed rubber layer 11 of the belt body 10, along the inner peripheral surface (i.e., the surface toward the pulley contact surface). The surface of the cover fabric 15 toward the belt body 10 is in contact with the rubber composition, of the surface rubber layer 11a, containing cellulose-based short fibers. The cover fabric 15 has a thickness suitably ranging from 0.3 mm to 1 mm, and more suitably ranging from 0.5 mm to 0.8 mm.

Examples of the synthetic fibers forming the fabric to be the cover fabric 15 include polyamide fibers, polyester fibers, and aramid fibers. Examples of the polyamide fibers include nylon 6 fibers and nylon 6,6 fibers. The synthetic fibers forming the fabric to be the cover fabric 15 suitably contain one kind or two or more kinds of these substances, more suitably contain polyamide fibers with an excellent wear resistance, and still more suitably contain nylon 6,6 fibers. The fiber material forming the fabric to be the cover fabric 15 may contain natural fibers such as cellulose-based fibers other than the synthetic fibers.

Examples of the fabric to be the cover fabric 15 include a knitted fabric, a woven fabric, and a nonwoven fabric. Examples of the knitted fabric include a weft knitted fabric and a warp knitted fabric. Examples of the weft knitted fabric include a plain knitted fabric, a rubber knitted fabric, and a pearl knit fabric. Examples of the warp knitted fabric include a tricot knitted fabric such as a denbigh knitted fabric, a cord knitted fabric, and an atlas knitted fabric. Examples of the woven fabric include a plain woven fabric, a twill woven fabric, and a satin woven fabric. The knitted fabric suitably has loops ranging from 20 to 80 loops, more suitably from 40 to 60 loops, per 2.54 cm in each of wale and course directions. In the knitted fabric, the number of loops in the wale direction is suitably less than or equal to that in the course direction, and more suitably less than that in the course direction. The cover fabric 15 is subjected to an adhesive treatment through immersion into an RFL aqueous solution or rubber cement so as to be adhesive to the belt body 10.

In the V-ribbed belt B according to the embodiment, the rubber composition, of the surface rubber layer 11a, containing cellulose-based short fibers is exuded from the gap between the fibers of the cover fabric 15. As a result, the cover fabric 15 and the rubber composition, of the surface rubber layer 11a, containing cellulose-based short fibers are exposed on the surfaces of the V-shaped ribs 16 serving as the pulley contact surface.

In an accessory drive belt transmission system for a motor vehicle, a V-ribbed belt is generally used as a power transmission belt. If the belt slips in a wet atmosphere, the transmission performance deteriorates, and stick-slip noise is also generated. Moreover, the fuel efficiency deteriorates. In the V-ribbed belt B according to this embodiment, however, the rubber composition containing cellulose-based short fibers is exposed, together with the cover fabric 15 made of the fabric containing the synthetic fibers as the main component, on the surfaces of the V-shaped ribs 16 serving as the pulley contact surface. The cover fabric 15 of the synthetic fibers exhibit a high wear resistance, and the cellulose-based short fibers absorb water in a wet atmosphere, which makes the pulley contact surface closer to a dry atmosphere. It is therefore possible to reduce the deterioration in the transmission performance of the belt in a wet atmosphere.

In view of the balance between the wear resistance of the cover fabric 15 and the water absorption of the cellulose-based short fibers, the cover fabric 15 has a surface occupancy suitably ranging from 40% to 90%, and more suitably ranging from 50% to 80%, on the surfaces of the V-shaped ribs 16 serving as the pulley contact surface. The surface occupancy of the cover fabric 15 is obtained as follows. An image of the surfaces of the V-shaped ribs 16 serving as the pulley contact surface is captured, and the tint of the image is binarized, specifically, the image is analyzed with the cover fabric 15 regarded as white and the rubber composition containing cellulose-based short fibers as black. The area fraction of the white representing the cover fabric 15 is then obtained. The surface occupancy of the cover fabric 15 depends on adjusting the degree of exudation of the rubber composition containing cellulose-based short fibers from the gap between the fibers of the cover fabric 15. The surface occupancy can be controlled by the texture of the fabric to be the cover fabric 15, the thickness or density of the yarn forming the fabric, the stretch rate or stretch direction of the fabric, or the viscosity of the rubber composition containing cellulose-based short fibers in the uncrosslinked state, for example.

Now, a method for producing the V-ribbed belt B according to the embodiment will be described.

Figure 2A:
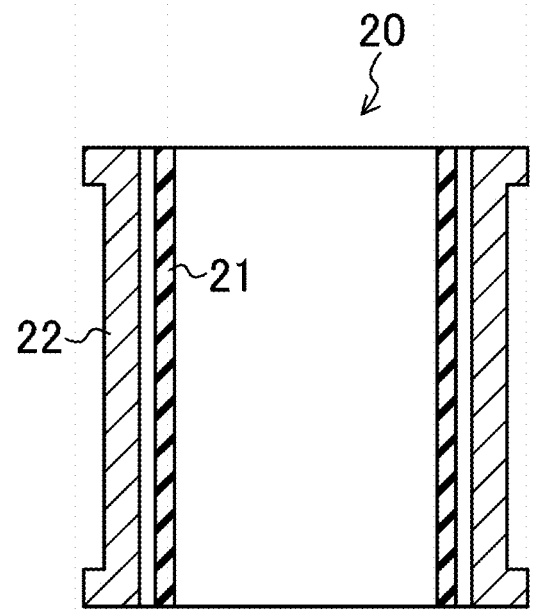
FIG. 2A is a longitudinal cross-sectional view of a belt forming mold.
Figure 2B:
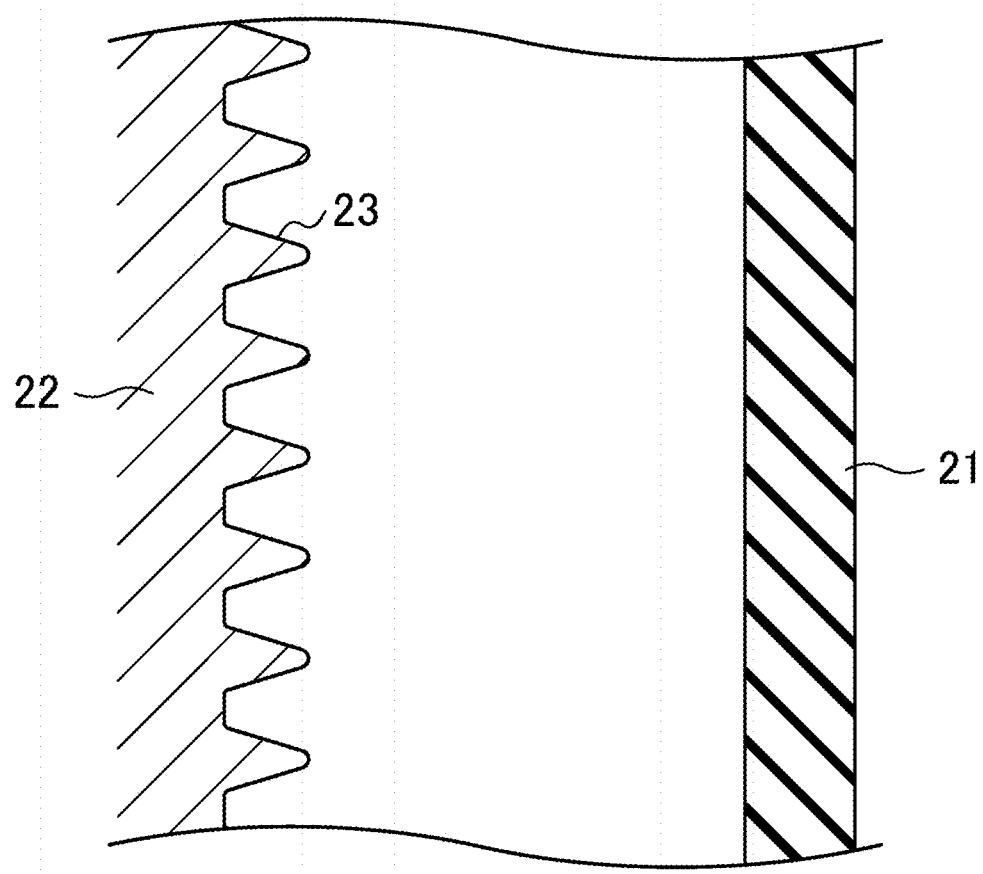
FIG. 2B is an enlarged longitudinal cross-sectional view of a part of the belt forming mold.

FIGS. 2A and 2B illustrate a belt forming mold 20 used in producing the V-ribbed belt B according to the embodiment.

The belt forming mold 20 includes an inner mold 21 and an outer mold 22 which are both in a cylindrical shape and concentric with each other.

The inner mold 21 is made of a flexible material such as rubber. The outer mold 22 is made of a rigid material such as metal. An inner peripheral surface of the outer mold 22 serves as a molding surface, and has V-shaped rib formation grooves 23 having the same shape as the V-shaped ribs 16 and arranged at regular pitches in an axial direction. The outer mold 22 includes a temperature control mechanism that controls the temperature by allowing a heating medium such as water vapor or a cooling medium such as water to circulate. In addition, a pressurizing means is provided to pressurize and expand the inner mold 21 from the inside.

(First Production Method)

A first method of producing the V-ribbed belt B according to the embodiment includes a material preparation step, a molding step, a crosslinking step, and a finishing step.

<Material Preparation Step>

A rubber component is masticated by a rubber mixer such as a kneader and a Banbury mixer. The cellulose-based short fibers and various compound ingredients are put into the masticated rubber component and kneaded. The obtained uncrosslinked rubber composition is pressed into a sheet by a calender or the like to produce an uncrosslinked rubber sheet 11a' that is to serve as the surface rubber layer of the belt body 10.

Similarly, a rubber component is masticated by rubber mixer such as a kneader and a Banbury mixer. The various compound ingredients are put into the masticated rubber component and kneaded. The obtained uncrosslinked rubber composition is pressed into a sheet by a calender or the like to produce uncrosslinked rubber sheets 11b', 12', and 13' that are to serve as the inner rubber layer, the adhesive rubber layer 12, and the stretch rubber layer 13 of the belt body 10.

Twisted yarn 14' that is to serve as the cord 14 is subjected to an adhesive treatment. Specifically, an RFL adhesive treatment is performed in which the twisted yarn 14' is immersed in an RFL aqueous solution and heated. If necessary, a primary coat adhesive treatment, in which the yarn is immersed into a primary coat adhesive treatment fluid and heated, is performed before the RFL adhesive treatment. In addition/or alternatively, a rubber cement adhesive treatment, in which the yarn is immersed into rubber cement and dried, is performed after the RFL adhesive treatment.

The fabric 15' that is to serve as the cover fabric 15 is subjected to an adhesive treatment. Specifically, an RFL adhesive treatment is performed in which the fabric 15' is immersed into an RFL aqueous solution and heated. If necessary, a primary coat adhesive treatment, in which the fabric is immersed into a primary coat adhesive treatment fluid and heated, is performed before the RFL adhesive treatment. In addition/or alternatively, a soaking adhesive treatment, in which the fabric is immersed into rubber cement and dried, is performed after the RFL adhesive treatment. The edges of the fabric 15' after the RFL adhesive treatment and the soaking adhesive treatment are joined into a cylindrical shape.

<Molding Step>

As shown in FIG. 3A, a cylindrical drum 24 with a smooth surface is covered with a rubber sleeve 25. Around the outer periphery of the rubber sleeve 25, the uncrosslinked rubber sheet 13' to be the stretch rubber layer 13 and the uncrosslinked rubber sheet 12' to be the adhesive rubber layer 12 are sequentially wrapped and layered at predetermined times. The twisted yarn 14' to be the cord 14 is wrapped therearound spirally with respect to the cylindrical inner mold 21. Furthermore, the uncrosslinked rubber sheet 12' to be the adhesive rubber layer 12, the uncrosslinked rubber sheet 11b' to be the inner rubber layer, and the uncrosslinked rubber sheet 11a' are sequentially wrapped and layered therearound at predetermined times. The fabric 15' to be the cover fabric 15 is placed thereon as a cover. At this time, an uncrosslinked slab S' is formed on the rubber sleeve 25. The uncrosslinked rubber sheet 11a' to be the surface rubber layer containing the cellulose-based short fibers may be used so that the grain direction corresponds to the belt length direction or the belt width direction.

<Crosslinking Step>

Figure 3C:
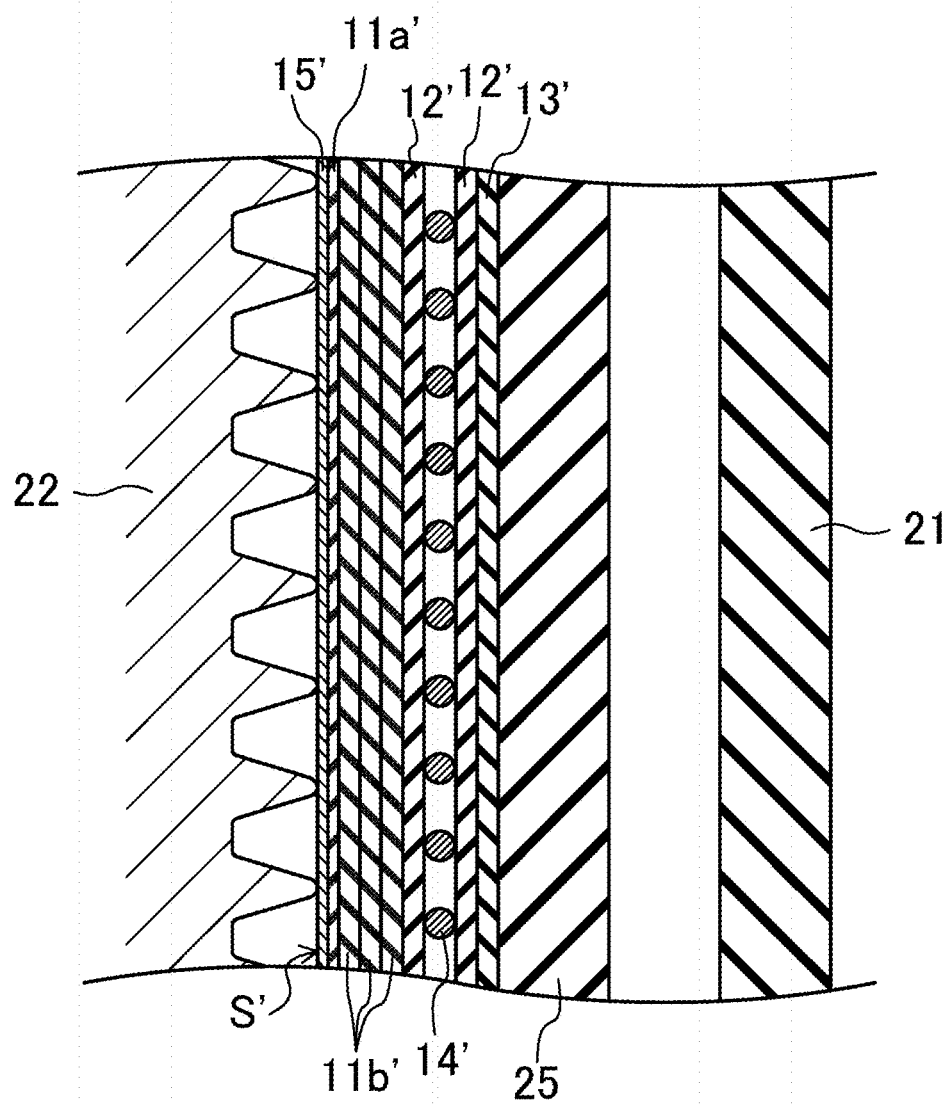
FIG. 3C is a third view illustrating the first method of producing the V-ribbed belt according to the embodiment.

The rubber sleeve 25 with the uncrosslinked slab S' is removed from the cylindrical drum 24 and fitted inside, and on the inner peripheral surface, of the outer mold 22 as shown in FIG. 3B. As shown in FIG. 3C, the inner mold 21 is then positioned in the rubber sleeve 25 placed in the outer mold 22 and sealed.

Figure 3D:
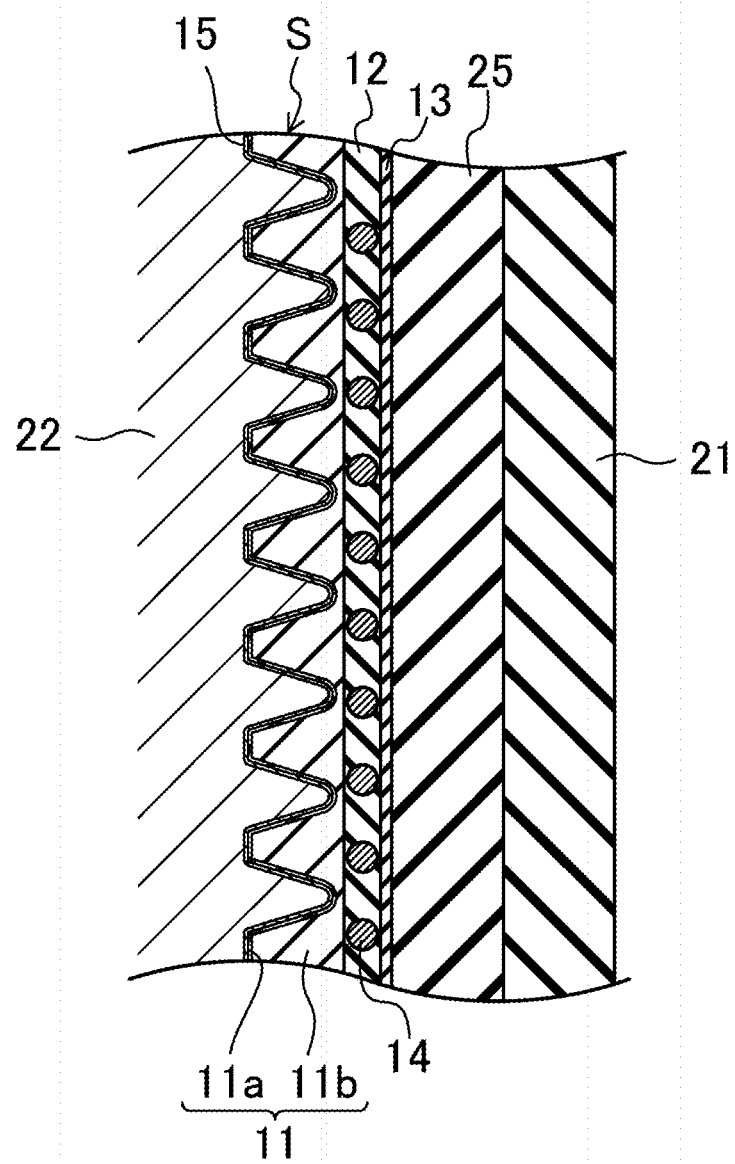
FIG. 3D is a fourth view illustrating the first method of producing the V-ribbed belt according to the embodiment.

The outer mold 22 is then heated, while high-pressure air, for example, is injected into the sealed inside of the inner mold 21 to perform pressurization. At this time, the inner mold 21 expands, so that the fabric 15' and the uncrosslinked rubber sheet 11a' to be the surface rubber layer of the uncrosslinked slab S' are along the molding surface of the outer mold 22. At the same time, the other sheets, i.e., the uncrosslinked rubber sheets 11b', 12', and 13', are compressed to flow, and the uncrosslinked rubber sheets 11a', 11b', 12', and 13' are further crosslinked and integrated, with which the twisted yarn 14' and the fabric 15' are combined and integrated. Eventually, the cylindrical belt slab S is molded as shown in FIG. 3D. The belt slab S is molded at a temperature ranging from 100° C. to 180° C., for example, at a pressure ranging from 0.5 MPa to 2.0 MPa, for example, and for a time ranging from 10 minutes to 60 minutes, for example.

<Finishing Step>

The inside of the inner mold 21 is depressurized to relieve the sealing. The belt slab S is taken out which has been molded between the inner mold 21 and the outer mold 22 with the rubber sleeve 25 interposed therebetween. The belt slab S is then cut into rings of a predetermined width and turned inside out, thereby obtaining the V-ribbed belt B.

(Second Production Method)

Figure 4A:
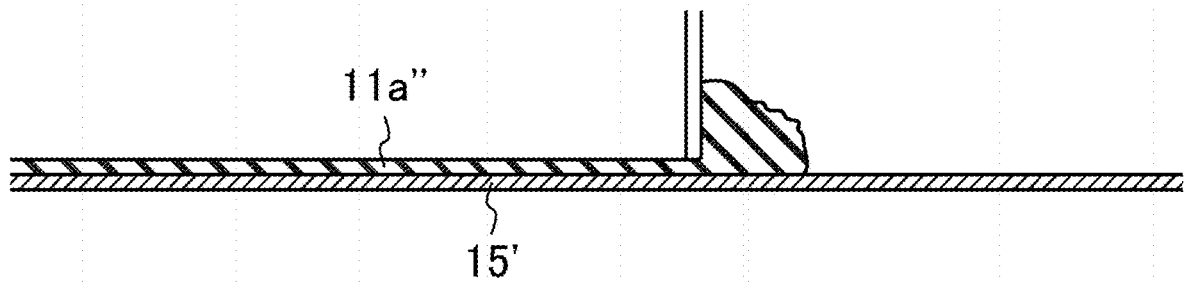
FIG. 4A is a first view illustrating a second method of producing the V-ribbed belt according to the embodiment.

In a second method of producing the V-ribbed belt B according to the embodiment, no uncrosslinked rubber sheet to be the surface rubber layer is produced but high-viscosity rubber cement is prepared in the material preparation step by dissolving an uncrosslinked rubber composition similar to the uncrosslinked rubber sheet into an organic solvent. As shown in FIG. 4A, the surface of the fabric 15' toward the belt body 10 that has undergone the RFL adhesive treatment and the soaking adhesive treatment is subjected to a coating adhesive treatment in which the rubber cement is coated on the surface of the fabric 15' toward the belt body 10 and dried. A rubber cement layer 11a" to serve as the surface rubber layer of the belt body 10 is layered on the fabric 15' in this manner. The ends of the fabric 15' after the coating adhesive treatment are joined into a cylindrical shape so as to have the rubber cement layer 11a" be arranged inside.

Figure 4B:
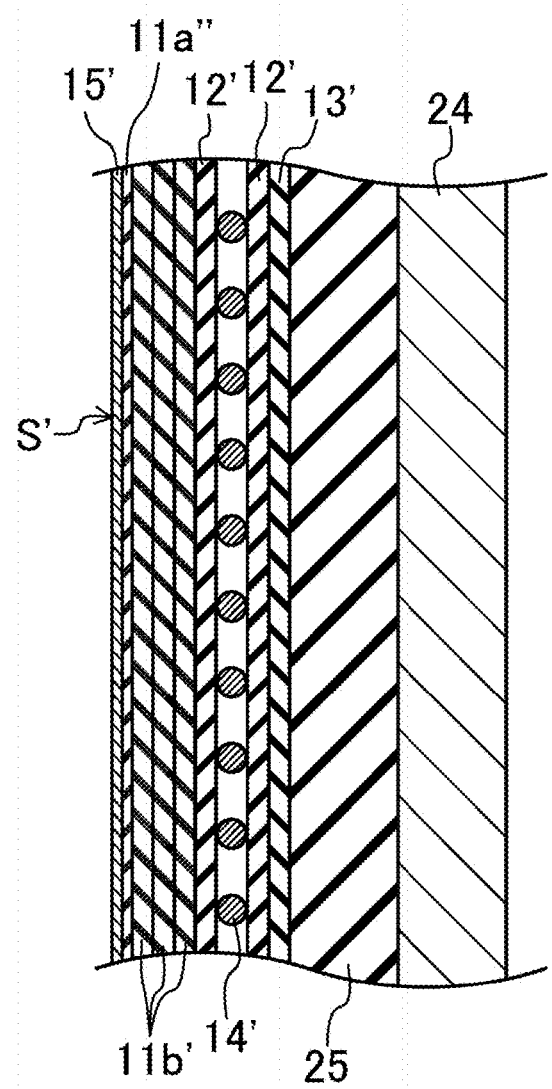
FIG. 4B is a second view illustrating the second method of producing the V-ribbed belt according to the embodiment.

In a subsequent molding step, as shown in FIG. 4B, a cylindrical drum 24 with a smooth surface is covered with a rubber sleeve 25. Around the outer periphery of the rubber sleeve, the uncrosslinked rubber sheet 13' to be the stretch rubber layer 13 and the uncrosslinked rubber sheet 12' to be the adhesive rubber layer 12 are sequentially wrapped and layered at predetermined times. The twisted yarn 14' to be the cord 14 is wrapped therearound spirally with respect to the cylindrical inner mold 21. Furthermore, the uncrosslinked rubber sheet 12' to be the adhesive rubber layer 12 and the uncrosslinked rubber sheet 11b' to be the inner rubber layer are sequentially wrapped and layered therearound at predetermined times. The fabric 15' having the rubber cement layer 11a" on the inner side is placed thereon to form an uncrosslinked slab S' on the rubber sleeve 25.

Like in the first production method, the uncrosslinked slab S' is placed in the belt forming mold 20 and heated and pressurized in the crosslinking step. At this time, the inner mold 21 expands, so that the fabric 15' on the uncrosslinked slab S' and the rubber cement 11a" are along the molding surface of the outer mold 22. At the same time, the uncrosslinked rubber sheets 11b', 12', and 13' are compressed to flow, and the rubber cement layer 11a" and the uncrosslinked rubber sheets 11b', 12', and 13' are further crosslinked and integrated, with which the twisted yarn 14' and the fabric 15' are combined and integrated. Eventually, the cylindrical belt slab S is molded.

The other steps are the same as those in the first production method.

Figure 5:
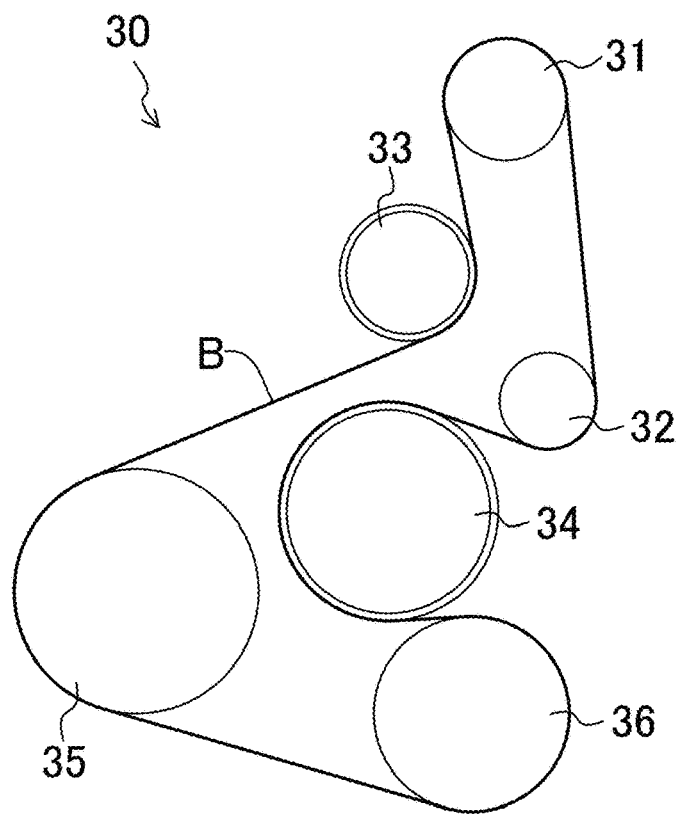
FIG. 5 illustrates a layout of pulleys of an accessory drive belt transmission system.

FIG. 5 illustrates a layout of pulleys in an accessory drive belt transmission system 30 for a motor vehicle using the V-ribbed belt B according to the embodiment. This accessory drive belt transmission system 30 is a serpentine drive system in which the V-ribbed belt B is wrapped around six pulleys to transmit power. The six pulleys include four ribbed pulleys and two flat pulleys.

This accessory drive belt transmission system 30 includes a power steering pulley 31, which is a ribbed pulley, at an uppermost position, and an AC generator pulley 32, which is a ribbed pulley, below the power steering pulley 31. A tensioner pulley 33, which is a flat pulley, is located at the lower left of the power steering pulley 31. A water pump pulley 34, which is a flat pulley, is located below the tensioner pulley 33. Furthermore, a crank shaft pulley 35, which is a ribbed pulley, is located at the lower left of the tensioner pulley 33. An air conditioner pulley 36, which is a ribbed pulley, is located at the lower right of the crank shaft pulley 35. These pulleys are made, for example, of pressed metals or castings, or resin moldings using, e.g., nylon resin and phenol resin, with a pulley diameter ranging from 50 mm to 150 mm.

In the accessory drive belt transmission system 30, the V-ribbed belt B is wrapped around the pulleys such that the V-ribbed belt B makes contact with the power steering pulley 31 via the V-shaped ribs 16, with the tensioner pulley 33 via its backface, with the crank shaft pulley 35 and the air conditioning pulley 36 in this order via the V-shaped ribs 16, with the water pump pulley 34 via its backface, and with the AC generator pulley 32 via the V-shaped ribs 16, and then returns to the power steering pulley 31 in the end. The belt span length, which is a length of the V-ribbed belt B between the pulleys, ranges from 50 mm to 300 mm, for example. The degree of misalignment allowable between the pulleys ranges from 0° to 2°.

In the embodiment described above, the compressed rubber layer 11 has a double layer structure including the surface rubber layer containing the cellulose-based short fibers and the inner rubber layer, but is not particularly limited thereto. The compressed rubber layer 11 may have a single layer structure containing the cellulose-based short fibers.

In the embodiment described above, the V-ribbed belt B has been described as a friction transmission belt, but is not limited thereto. As long as the cover fabric 15 and the rubber composition containing cellulose-based short fibers are exposed on the pulley contact surface, the belt may be any other friction transmission belt such as a wrapped V-belt or a flat belt or may be a meshing transmission belt such as a toothed belt.

EXAMPLES (V-ribbed Belt)

V-ribbed belts according to the following Examples 1 to 3 and Comparative Examples 1 and 2 were prepared.

Example 1

A V-ribbed belt with a length of 1257 mm and six V-shaped ribs, and a V-ribbed belt with a length of 1257 mm and three V-shaped ribs were prepared. The belts had the same configuration as in the embodiment described above. These two V-ribbed belts were used in Example 1.

Figure 6:
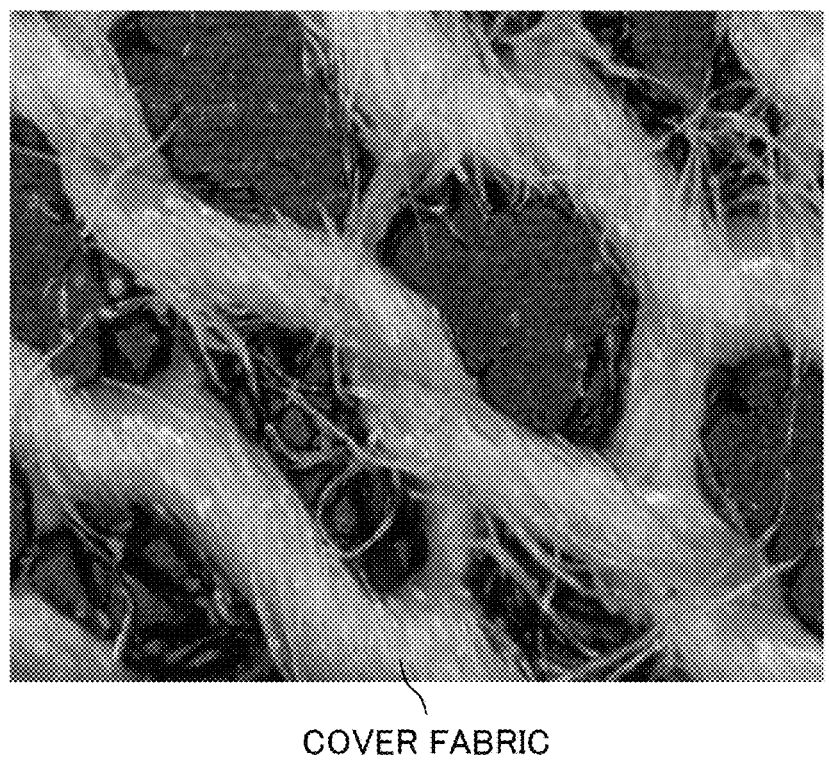
FIG. 6 is a photograph of the pulley contact surface of a V-ribbed belt according to Example 1.

In each V-ribbed belt according to Example 1, the surface rubber layer was made of a rubber composition containing cellulose-based short fibers, in which EPDM as the rubber component contained 28 parts by mass of cotton with a fiber diameter of 20 μm and a fiber length of 0.3 mm with respect to 100 parts by mass of the rubber component. As the cover fabric, a plain knitted fabric was used which was made of bulky yarn of nylon 6,6 fibers with 40 and 60 loops in the wale and course directions, respectively. The belt slab was molded at a pressure of 1.4 MPa. The cover fabric and the rubber composition containing cellulose-based short fibers were exposed on the surfaces of the V-shaped ribs serving as the pulley contact surface, as shown in FIG. 6. An image of the surfaces was captured, and the tint of the image was binarized, specifically, the image was analyzed with the cover fabric regarded as white and the rubber composition containing cellulose-based short fibers as black. The result shows that the surface occupancy of the cover fabric was 83%, whereas the surface occupancy of the rubber composition containing cellulose-based short fibers was 17%.

Note that the inner rubber layer, the adhesive rubber layer, and the stretch rubber layer were made of rubber compositions containing EPDM as the rubber component, whereas the cord was made of twisted yarn of polyester fibers.

Example 2

Two types of V-ribbed belts having the same configurations as those in Example 1 were prepared except that as the cover fabric, a plain knitted fabric was used which was made of bulky yarn of nylon 6,6 fibers with 40 loops in each of the wale and course directions. These two V-ribbed belts were used in Example 2. In each V-ribbed belt according to Example 2, the surface occupancy of the cover fabric was 72%, whereas the surface occupancy of the rubber composition containing cellulose-based short fibers was 28%, on the surfaces of the V-shaped ribs serving as the pulley contact surface.

Example 3

Two types of V-ribbed belts having the same configurations as those in Example 1 were prepared except that as the cover fabric, a plain knitted fabric was used which was made of bulky yarn of nylon 6,6 fibers with 40 loops in each of the wale and course directions and that the pressure in molding the belt slab was 1.6 MPa. These two V-ribbed belts were used in Example 3. In each V-ribbed belts according to Example 3, the surface occupancy of the cover fabric was 57%, whereas the surface occupancy of the rubber composition containing cellulose-based short fibers was 43%, on the surfaces of the V-shaped ribs serving as the pulley contact surface.

Comparative Example 1

Two types of V-ribbed belts having the same configurations as those in Example 1 were prepared except that as the cover fabric, a plain knitted fabric was used which was made of bulky yarn of nylon 6,6 fibers with 40 and 60 loops in the wale and course directions, respectively, and that the pressure in molding the belt slab was 1.2 MPa. These two V-ribbed belts were used in Comparative Example 1. In each V-ribbed belt according to Comparative Example 1, only the cover cloth was exposed on the surfaces of the V-shaped ribs serving as the pulley contact surface, that is, the surface occupancy of the cover fabric was 100%.

Comparative Example 2

Two types of V-ribbed belts having the same configurations as those in Comparative Example 1 were prepared except that as the cover fabric, a plain knitted fabric was used which was made of 50s cotton yarn with 40 and 60 loops in the wale and course directions, respectively. These two V-ribbed belts were used in Comparative Example 2. In each V-ribbed belt according to Comparative Example 2, the surface occupancy of the cover fabric was 100% on the surfaces of the V-shaped ribs serving as the pulley contact surface.

(Test Method)
<Power Transmission Test in Wet Atmosphere>

Figure 7A:
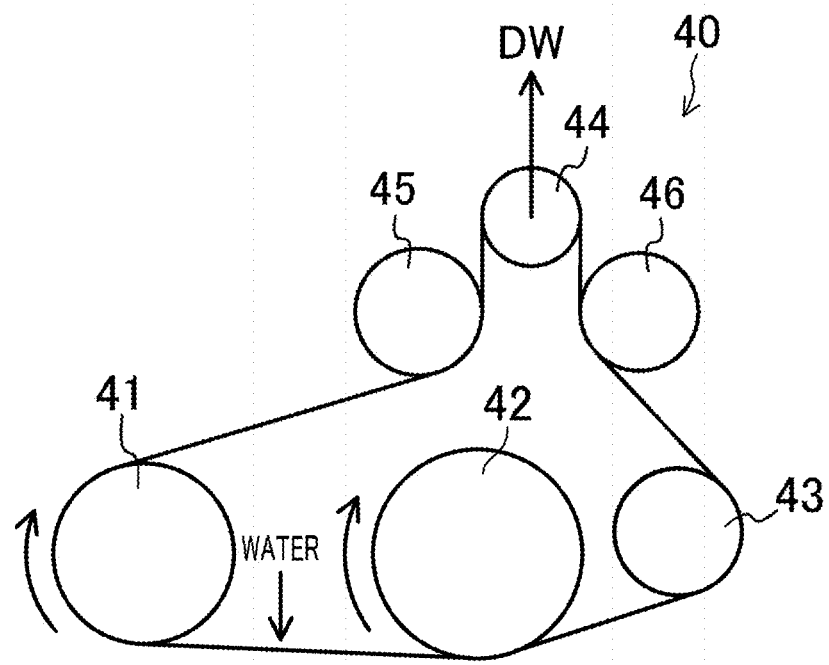
FIG. 7A illustrates a layout of pulleys of a belt running tester for a power transmission test in a wet atmosphere.

FIG. 7A illustrates a layout of pulleys of a belt running tester 40 for a power transmission test in a wet atmosphere.

The belt running tester 40 for a power transmission test in a wet atmosphere includes: a first drive pulley 41, which is a ribbed pulley with a diameter of 121.6 mm, on the lower left; and a second drive pulley 42, which is a ribbed pulley with a diameter of 141.5 mm, on the right of the first drive pulley 41. A first driven pulley 43, which is a ribbed pulley with a diameter of 77.0 mm, is located at the upper right of the second drive pulley 42. A second driven pulley 44, which is a ribbed pulley with a diameter of 61.0 mm, is located above the second drive pulley 42. Between the first drive pulley 41 and the second driven pulley 44, a first idler pulley 45 is located which is a flat pulley with a diameter of 76.2 mm Between the first driven pulley 43 and the second driven pulley 44, a second idler pulley 46 is located which is a flat pulley with a diameter of 76.2 mm. The second driven pulley 44 is vertically movable to apply an axial load.

Each of the V-ribbed belts B according to Examples 1 to 3 and Comparative Examples 1 and 2 having six V-shaped ribs was wrapped around the first and second drive pulleys 41 and 42 and the first and second driven pulleys 43 and 44 so that the V-shaped ribs were in contact with the pulleys, and around the first and second idler pulleys 45 and 46 so that the stretch rubber layer was in contact with the pulleys. An upward axial load of 706 N was applied onto the second driven pulley 44 to provide a belt tension. The V-ribbed belt B was wrapped around the second drive pulley 42 at an angle of 39°. Then, in a temperature atmosphere of 21° C., the first and second drive pulleys 41 and 42 were rotated at speeds of 800 rpm and 931 rpm, respectively, in the same direction, whereby the V-ribbed belt B was forcibly slipped on the second drive pulley 42. In addition, 300 ml of water was dropped in every minute onto the surfaces of the V-shaped ribs at the start point of wrapping of the V-ribbed belt B at the right of the second drive pulley 41. The maximum value of the torque generated was measured by a torque meter located at the second drive pulley 42.

<Wear Resistance Test>

Figure 7B:
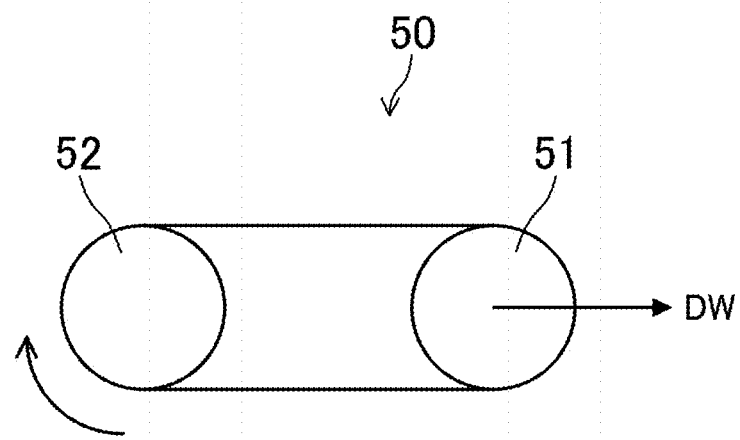
FIG. 7B illustrates a layout of pulleys of a belt running tester for a wear resistance test.

FIG. 7B illustrates a layout of pulleys of a belt running tester 50 for a wear resistance test.

The belt running tester 50 for a wear resistance test includes: a drive pulley 51, which is a ribbed pulley with a diameter of 60 mm, on the right; and a driven pulley 52, which is a ribbed pulley with a diameter of 60 mm, on the left. The drive pulley 51 is transversely movable to apply an axial load. The driven pulley 52 is applied with a rotational load of 3.8 kW (5.2 PS).

Each of the V-ribbed belts B according to Examples 1 to 3 and Comparative Examples 1 and 2 having three V-shaped ribs was wrapped around the drive and driven pulleys 51 and 52 so that the V-shaped ribs were in contact with the pulleys. An axial load of 1176 N was applied onto the first drive pulley 1 toward the right to provide a belt tension. The belt was caused to run at a room temperature for 170 hours with the drive pulley 51 rotated at a speed of 3500 rpm. Then, the mass change before and after the belt running was obtained, which was used as a wear loss to calculate a wear rate.

(Test Results)

Figure 8A:
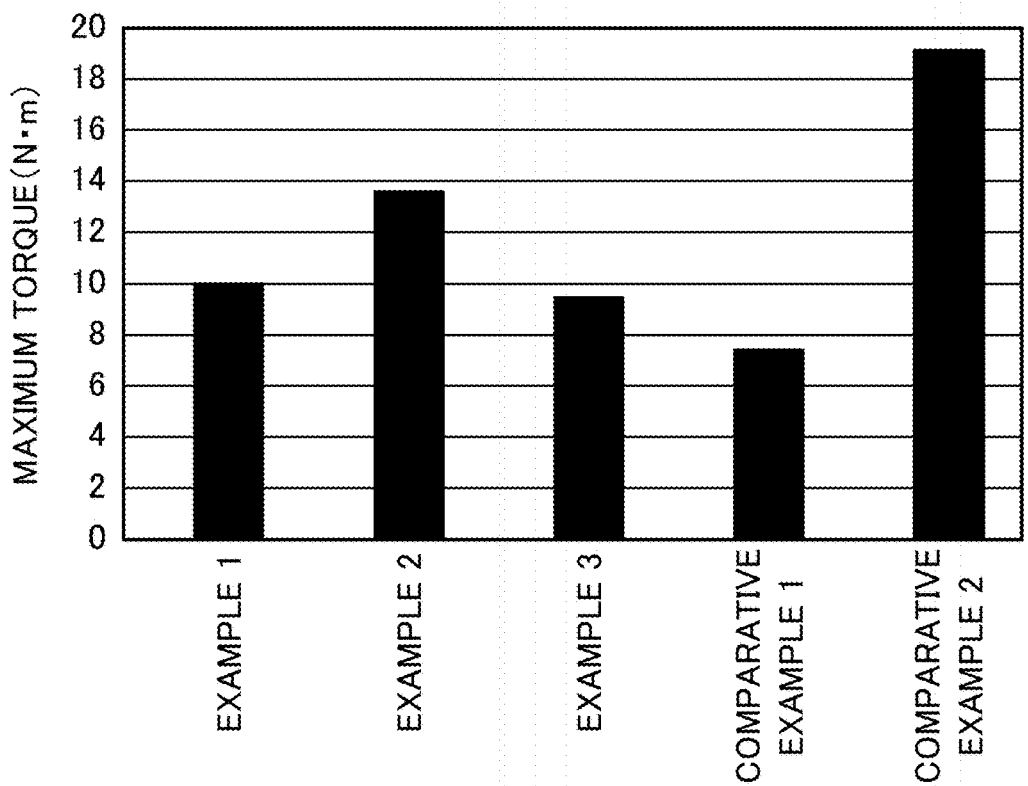
FIG. 8A is a graph illustrating a result of the power transmission test in the wet atmosphere.

FIG. 8A shows the maximum torques according to Examples 1 to 3 and Comparative Examples 1 and 2 in the power transmission test in the WET atmosphere. The graph shows that the maximum torque is the lowest in Comparative Example 1 in which the cover fabric made of nylon 6,6 fibers has a surface occupancy of 100% on the surfaces of the V-shaped ribs serving as the pulley contact surface, whereas the maximum torque is the highest in Comparative Example 2 in which the cover fabric made of cotton yarn has a surface occupancy of 100% on the surfaces of the V-shaped ribs serving as the pulley contact surface, and that the maximum torques of Examples 1 to 3, in which the cover fabric and the rubber composition containing cellulose-based short fibers are exposed on the surfaces of the V-shaped ribs serving as the pulley contact surface, are between those of Comparative Examples 1 and 2. It is also found that the maximum torque according to Example 2 is the highest among Examples 1 to 3.

Figure 8B:
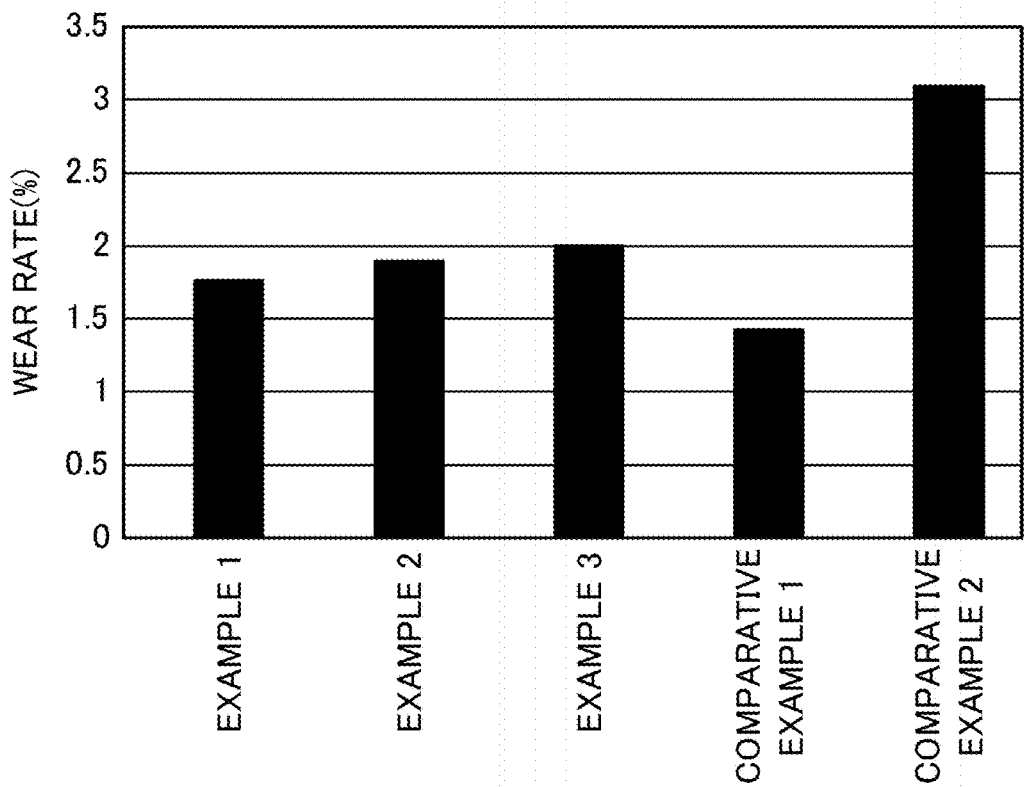
FIG. 8B is a graph illustrating a result of the wear resistance test.

FIG. 8B shows the wear rates of Examples 1 to 3 and Comparative Examples 1 and 2 in the wear resistance test. The graph shows that the wear rate is the lowest in Comparative Example 1 in which the cover fabric made of nylon 6,6 fibers has a surface occupancy of 100% on the surfaces of the V-shaped ribs serving as the pulley contact surface, whereas the wear rate is the highest in Comparative Example 2 in which the cover fabric made of cotton yarn has a surface occupancy of 100% on the surfaces of the V-shaped ribs serving as the pulley contact surface, and that the wear rates of Examples 1 to 3, in which the cover fabric and the rubber composition containing cellulose-based short fibers are exposed on the surfaces of the V-shaped ribs serving as the pulley contact surface, are between those of Comparative Examples 1 and 2. It is also found that the wear rate according to Example 3 is the highest among Examples 1 to 3.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt comprising:
a belt body; and
a cover fabric made of a fabric containing synthetic fibers as a main component and covering a surface of the belt body toward a pulley, wherein
the cover fabric has a surface toward the belt body, the surface being in contact with a rubber composition containing cellulose-based short fibers, the rubber composition including a rubber component in which the cellulose-based short fibers are dispersed, and
part of the rubber composition is exuded through gaps between fibers of the cover fabric to a pulley contact surface of the cover fabric, wherein the part of the rubber composition that is exuded includes some of the rubber component and one or more cellulose based short fibers; and
both of the pulley contact surface of the cover fabric and a surface of the rubber composition containing cellulose-based short fibers exuded through the cover fabric are to be in contact with the pulley.

2. The power transmission belt of claim 1, wherein the rubber composition containing the cellulose-based short fibers serves as a part of the belt body covered with the cover fabric.

3. The power transmission belt of claim 1, wherein the rubber component of the rubber composition containing the cellulose-based short fibers includes an ethylene-α-olefin elastomer.

4. The power transmission belt of claim 1, wherein the rubber composition containing the cellulose-based short fibers contains 5 parts by mass or more and 60 parts by mass or less of the cellulose-based short fibers with respect to 100 parts by mass of the rubber component.

5. The power transmission belt of claim 1, wherein the cellulose-based short fibers have a fiber length ranging from 0.1 mm to 1 mm.

6. The power transmission belt of claim 1, wherein the cellulose-based short fibers have a fiber diameter ranging from 10 μm to 50 μm.

7. The power transmission belt of claim 1, wherein the cellulose-based short fibers include cotton.

8. The power transmission belt of claim 1, wherein the cover fabric has a surface occupancy ranging from 40% to 90% of the pulley contact surface.

9. The power transmission belt of claim 1, wherein the synthetic fibers forming the fabric to be the cover fabric include polyamide fibers.

10. The power transmission belt of claim 1, wherein the fabric to be the cover fabric is a knitted fabric.

11. The power transmission belt of claim 10, wherein the knitted fabric forming the fabric to be the cover fabric has 20 loops or more and 80 loops or less per 2.54 cm in each of wale and course directions.

12. The power transmission belt of claim 10, wherein in the knitted fabric forming the fabric to be the cover fabric, the number of the loops in the wale direction is less than or equal to the number of loops in the course direction.

\* \* \* \* \*